United States Patent

Feiz

(10) Patent No.: US 7,752,833 B2
(45) Date of Patent: Jul. 13, 2010

(54) METHODS AND APPARATUS FOR GAS TURBINE FUEL CONTROL

(75) Inventor: Majid Feiz, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 641 days.

(21) Appl. No.: 11/328,942

(22) Filed: Jan. 10, 2006

(65) Prior Publication Data

US 2007/0157619 A1 Jul. 12, 2007

(51) Int. Cl.
*F02C 9/00* (2006.01)

(52) U.S. Cl. .................... 60/39.281; 60/772; 60/39.645

(58) Field of Classification Search .................... 60/773, 60/776, 39.281, 39.645, 772; 700/45
See application file for complete search history.

(56) References Cited

U.S. PATENT DOCUMENTS

| | | | | |
|---|---|---|---|---|
| 2,986,883 | A | * | 6/1961 | Yao .............................. 60/734 |
| 4,277,832 | A | * | 7/1981 | Wong ......................... 700/282 |
| 4,417,440 | A | | 11/1983 | Hawes |
| 4,424,666 | A | | 1/1984 | Woody |
| 4,473,999 | A | | 10/1984 | Smith |
| 4,716,719 | A | * | 1/1988 | Takahashi et al. ............. 60/773 |
| 4,716,723 | A | | 1/1988 | Ralston et al. |
| 5,141,391 | A | | 8/1992 | Acton et al. |
| 5,463,863 | A | * | 11/1995 | Severn et al. ................. 60/773 |
| 5,665,916 | A | * | 9/1997 | Puster et al. .................. 73/590 |
| 5,689,066 | A | | 11/1997 | Stevenson |
| 7,136,738 | B2 | | 11/2006 | Zagranski et al. |
| 2004/0231314 | A1 | * | 11/2004 | Gainford ................. 60/39.281 |

FOREIGN PATENT DOCUMENTS

| | | |
|---|---|---|
| EP | 0560490 A1 | 9/1993 |
| EP | 1310647 A1 | 5/2003 |

OTHER PUBLICATIONS

EP Foreign Search Report dated Mar. 15, 2010 for related application 07100141.6-2321/1806492.

* cited by examiner

*Primary Examiner*—Michael Cuff
*Assistant Examiner*—Phutthiwat Wongwian
(74) *Attorney, Agent, or Firm*—Armstrong Teasdale LLP

(57) ABSTRACT

A method for reducing or eliminating oscillations in a gas turbine fuel control system includes utilizing an engine model to regulate a gas supply pressure for a gas turbine, sensing the pressure of gas actually supplied, and applying integral state feedback plus gas supply pressure feedforward combined with integral plus state feedback to the engine model to control and reduce gas fuel supply variations.

11 Claims, 2 Drawing Sheets

METHODS AND APPARATUS FOR GAS TURBINE FUEL CONTROL

BACKGROUND OF THE INVENTION

This invention relates generally to gas turbines and more particularly to fuel control systems for gas turbines.

Referring to FIG. 2, at least one known prior art industrial gas turbine gas fuel control system 200 relies upon steady fuel pressure P2 upstream of a set of parallel gas control valves 202, 204. For this reason, a pressure control valve 206 is employed immediately upstream of parallel gas control valves 202, 204 to regulate this intervalve pressure P2.

Persistent oscillation of fuel intervalve pressure P2 resulting from gas fuel supply pressure P1 variations can become a problem in gas turbine fuel control systems 200. Prior art proportional 208 plus integral 210 controls react solely to P2 error, and consequently has poor P1 disturbance rejection capability. Thus, gas supply pressure P1 variation can cause gas fuel intervalve pressure P2 to oscillate as a result of the lack of disturbance rejection in prior art gas turbine fuel control systems.

BRIEF DESCRIPTION OF THE INVENTION

In one aspect, some configurations of the present invention therefore provide a method for reducing or eliminating oscillations in a gas turbine fuel control system. The method includes utilizing an engine model to regulate a gas supply pressure for a gas turbine, sensing the pressure of gas actually supplied, and applying integral state feedback plus gas supply pressure feedforward combined with integral plus state feedback to the engine model to control and reduce gas fuel supply variations.

In another aspect, some configurations of the present invention provide an apparatus for reducing or eliminating oscillations in a gas turbine fuel control system. The apparatus includes an engine model component configured to regulate a gas supply pressure for a gas turbine, a pressure sensor configured to sense a pressure of gas actually supplied to the turbine, and an integral state feedback plus gas supply pressure feedforward combined with integral plus state feedback module configured to provide a positive feedback reference signal to the engine model to control and reduce gas fuel supply variations.

It will be appreciated that configurations of the present invention minimize or at least reduce the effect of gas fuel system supply pressure variations on regulated gas intervalve pressure.

DETAILED DESCRIPTION OF THE INVENTION

A technical effect of the present invention is to minimize or at least reduce the effect of gas fuel system supply pressure variations on regulated gas intervalve pressure.

Figure 1:
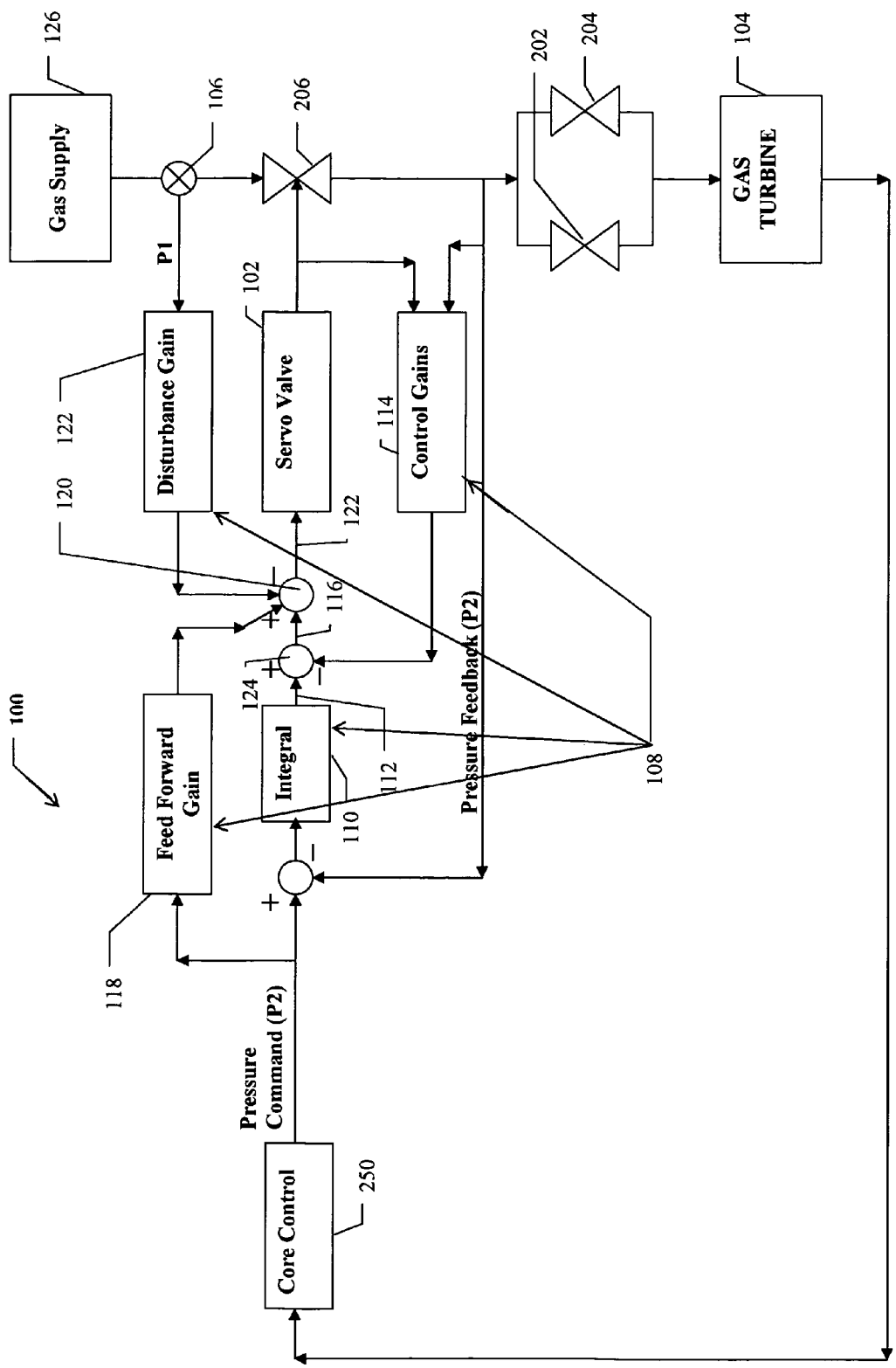
FIG. 1 is a block diagram representing of a gas turbine fuel control system configuration of the present invention.

In some configurations of the present invention and referring to FIG. 1, a method for reducing or eliminating oscillations in a gas turbine fuel control system 100 is provided. The method includes utilizing an engine model 102 to regulate a gas supply pressure P1 for a gas turbine 104, sensing the pressure of gas actually supplied utilizing a pressure gauge or meter 106, and applying integral state feedback plus gas supply pressure feedforward combined with integral plus state feedback 108 to engine model 102 to control and reduce gas fuel supply variations.

In some configurations of the present invention, applying integral state feedback plus gas supply pressure feedforward combined with integral plus state feedback to the engine controller further comprises integrating 110 a signal comprising a pressure feedback signal P2 from engine model 102 subtracted from a pressure setpoint to create an integral signal 112.

In some configurations, applying integral state feedback plus gas supply pressure feedforward combined with integral plus state feedback to the engine controller further comprises adding a pressure feedback signal from engine model 102 multiplied 114 by a control gain to the integral signal to create a integral/sum signal 116.

Also in some configurations, applying integral state feedback plus gas supply pressure feedforward combined with integral plus state feedback to the engine controller further comprises adding the pressure setpoint P2 multiplied by a feed forward gain 118 to the integral/sum signal 116 to produce a feedforward/integral/sum signal (in FIG. 1, the feedforward/integral/sum signal is internal to adder 120).

And in some configurations, applying integral state feedback plus gas supply pressure feedforward combined with integral plus state feedback to the engine controller further comprises adding a measured gas supply pressure P1 multiplied by a disturbance gain 122 to the integral/sum signal to produce a disturbance/integral/sum signal (inside adder 120 in the configuration of FIG. 1).

Also in some configurations, applying integral state feedback plus gas supply pressure feedforward combined with integral plus state feedback to the engine controller further comprises adding the pressure setpoint P2 multiplied by a feed forward gain 118 and a measured gas supply pressure P1 multiplied by a disturbance gain 122 to the integral/sum signal to produce a positive feedback reference signal 124 input to engine model 102.

In some configurations and still referring to FIG. 1, an apparatus is provided for reducing or eliminating oscillations in a gas turbine fuel control system. The apparatus includes an engine model component 102 configured to regulate a gas supply pressure P1 for a gas turbine 104. Engine model component 102 is, for example, a computer or processor running a control program, or another type of circuit, either analog or digital, that performs the functions required of an engine model. The apparatus further includes a pressure sensor 106 configured to sense a pressure of gas actually supplied to turbine 104 and an integral state feedback plus gas supply pressure feedforward combined with integral plus state feedback module 108 configured to provide a positive feedback reference signal 122 to engine model 102 to control and reduce gas fuel supply variations.

In some configurations, the integral state feedback plus gas supply pressure feedforward combined with integral plus state feedback module further comprises an integrator 110 configured to integrate a signal comprising a pressure feedback signal from engine model 102 subtracted from a pressure setpoint P2 to create an integral signal 112.

Also in some configurations, the integral state feedback plus gas supply pressure feedforward combined with integral plus state feedback module further comprises an addition module 124 configured to add a pressure feedback signal from engine model 102 multiplied by a control gain 114 to the integral signal to create a integral/sum signal 116.

And in some configurations, the integral state feedback plus gas supply pressure feedforward combined with integral plus state feedback module further comprises an addition module 120 configured to add the pressure setpoint P2 multiplied by a feed forward gain 118 to integral/sum signal 116 to produce a feedforward/integral/sum signal (in FIG. 1, this occurs inside addition module 120).

In some configurations, the integral state feedback plus gas supply pressure feedforward combined with integral plus state feedback module further comprises an addition module 120 configured to add a measured gas supply pressure P1 multiplied by a disturbance gain 120 to integral/sum signal 116 to produce a disturbance/integral/sum signal (also inside addition module 120 in FIG. 1).

In some configurations, the addition module configured to add a measured gas supply pressure multiplied by a disturbance gain to the integral/sum signal is further configured to add pressure setpoint P2 multiplied by a feed forward gain 118 and a measured gas supply pressure P1 multiplied by a disturbance gain 120 to the integral/sum signal 116 to produce a positive feedback reference signal 120 input to engine model 102.

In some configurations, the apparatus further includes a gas fuel supply 126 controlled by engine model 102 and further includes a gas turbine 104.

The various modules and components, to the extent that they are configured to perform arithmetic operations, can be realized in the form of digital hardware and/or software, including, for example, a microprocessor/controller having memory in which a stored program performs the arithmetic functions described herein. Through use of proper hardware, most or all of the control blocks, including the engine module, can be provided in a single integrated circuit or a few integrated circuits and/or discrete components.

Figure 2:
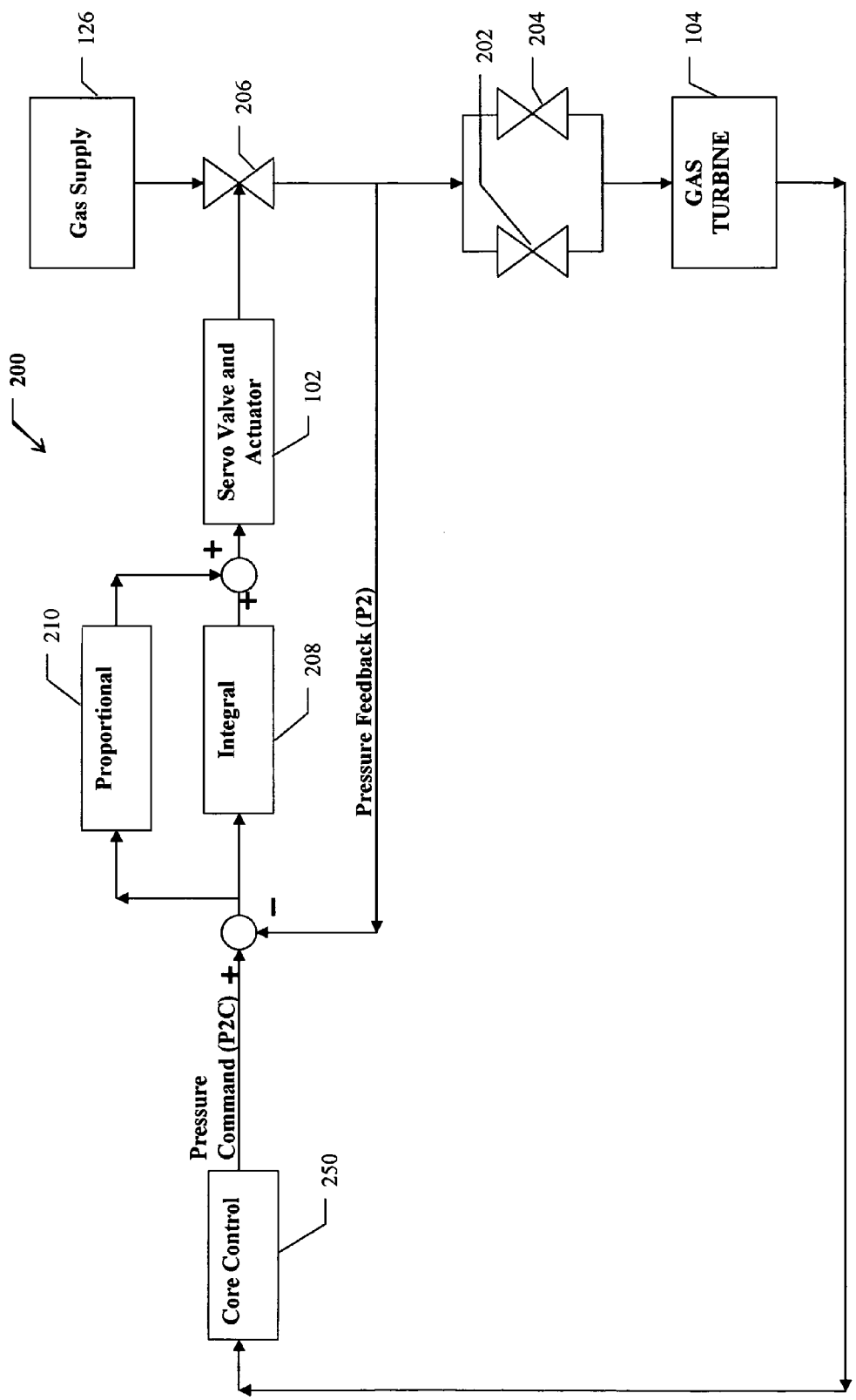
FIG. 2 is a block diagram representing of a prior art gas turbine fuel control system.

It will be appreciated that configurations of the present invention minimize or at least reduce the effect of gas fuel system supply pressure variations on regulated gas intervalve pressure. In particular, initial simulation results indicate 93.75% reduction of the oscillations in intervalve pressure P2 response over the prior art configuration represent in FIG. 2.

While the invention has been described in terms of various specific embodiments, those skilled in the art will recognize that the invention can be practiced with modification within the spirit and scope of the claims.

What is claimed is:

1. A method for reducing or eliminating oscillations in a gas turbine fuel control system, said method comprising
utilizing an engine model to regulate a gas supply pressure for a gas turbine;
sensing the pressure of gas actually supplied;
adding a pressure feedback signal from the engine model multiplied by a control gain to an integral signal to create a integral/sum signal; and
applying integral state feedback plus gas supply pressure feedforward combined with integral plus state feedback to the engine model to control and reduce gas fuel supply variations.

2. A method in accordance with claim 1 wherein said adding a pressure feedback signal from the engine model multiplied by a control gain to an integral signal to create a integral/sum signal further comprises integrating a signal comprising a pressure feedback signal from the engine model subtracted from a pressure setpoint to create the integral signal.

3. A method in accordance with claim 2 wherein said applying integral state feedback plus gas supply pressure feedforward combined with integral plus state feedback to the engine model further comprises adding the pressure setpoint multiplied by a feed forward gain to the integral/sum signal to produce a feedforward/integral/sum signal.

4. A method in accordance with claim 2 wherein said applying integral state feedback plus gas supply pressure feedforward combined with integral plus state feedback to the engine model further comprises adding a measured gas supply pressure multiplied by a disturbance gain to the integral/sum signal to produce a disturbance/integral/sum signal.

5. A method in accordance with claim 4 wherein said applying integral state feedback plus gas supply pressure feedforward combined with integral plus state feedback to the engine model further comprises adding the pressure setpoint multiplied by a feed forward gain and a measured gas supply pressure multiplied by a disturbance gain to the integral/sum signal to produce a positive feedback reference signal input to the engine model.

6. An apparatus for reducing or eliminating oscillations in a gas turbine fuel control system, said apparatus comprising:
an engine model component configured to regulate a gas supply pressure for a gas turbine;
a pressure sensor configured to sense a pressure of gas actually supplied to the integral plus state feedback module comprising an addition module configured to:
add a pressure feedback signal from the engine model multiplied by a control gain to an integral signal to create an integral/sum signal; and
provide the integral/sum signal to the engine model to control and reduce gas fuel supply variations.

7. An apparatus in accordance with claim 6 wherein said integral state feedback plus gas supply pressure feedforward combined with integral plus state feedback module further comprises an integrator configured to integrate a signal comprising a pressure feedback signal from the engine model subtracted from a pressure setpoint to create the integral signal.

8. An apparatus in accordance with claim 7 wherein said integral state feedback plus gas supply pressure feedforward combined with integral plus state feedback module further comprises an addition module configured to add the pressure setpoint multiplied by a feed forward gain to the integral/sum signal to produce a feedforward/integral/sum signal.

9. An apparatus in accordance with claim 7 wherein said integral state feedback plus gas supply pressure feedforward combined with integral plus state feedback module further comprises an addition module configured to add a measured gas supply pressure multiplied by a disturbance gain to the integral/sum signal to produce a disturbance/integral/sum signal.

10. An apparatus in accordance with claim 9 wherein said addition module configured to add a measured gas supply pressure multiplied by a disturbance gain to the integral/sum signal is further configured to add the pressure setpoint multiplied by a feed forward gain and a measured gas supply pressure multiplied by a disturbance gain to the integral/sum signal to produce a positive feedback reference signal input to the engine model.

11. An apparatus in accordance with claim 6 further comprising a gas fuel supply controlled by the engine model and also further comprising a gas turbine.

* * * * *